United States Patent [19]
Pariseau

[11] Patent Number: 5,810,657
[45] Date of Patent: Sep. 22, 1998

[54] CONTROLLER TO MAINTAIN A CERTAIN SET OF ENVIRONMENTAL PARAMETERS IN AN ENVIRONMENT

[75] Inventor: David Pariseau, Milpitas, Calif.

[73] Assignee: Lighthouse Associates, Inc., Milpitas, Calif.

[21] Appl. No.: 706,628

[22] Filed: Sep. 6, 1996

Related U.S. Application Data

[63] Continuation of Ser. No. 343,639, Nov. 22, 1994, abandoned.

[51] Int. Cl.$^6$ ..................................................... B08B 15/02
[52] U.S. Cl. ................................................. 454/61; 454/67
[58] Field of Search ................... 454/49, 58, 59, 454/61, 238, 239, 340, 67

[56] References Cited

U.S. PATENT DOCUMENTS

| | | | |
|---|---|---|---|
| 4,497,242 | 2/1985 | Moyer | 454/61 |
| 4,706,553 | 11/1987 | Sharp et al. | 454/61 |
| 5,090,303 | 2/1992 | Ahmed | 454/58 |
| 5,115,728 | 5/1992 | Ahmed et al. | 454/61 |
| 5,187,417 | 2/1993 | Minnich et al. | 318/254 |
| 5,215,497 | 6/1993 | Drees | 454/61 |
| 5,257,958 | 11/1993 | Jagers | 454/238 |
| 5,385,505 | 1/1995 | Sharp et al. | 454/61 X |
| 5,405,291 | 4/1995 | Alcorn et al. | 454/61 |

*Primary Examiner*—Harold Joyce
*Attorney, Agent, or Firm*—Strasburger & Price LLP; Matthew J. Booth

[57] ABSTRACT

A system controller continuously monitors the differential pressure between two environments, and dynamically adjusts an air handling system of the controlled environment to maintain a desired differential pressure setpoint by using a closed loop control methodology. Local and remote users can initialize, configure, monitor, and readjust the differential pressure setpoint as necessary. A differential pressure sensor transmits data to the system controller for processing and analysis. The system controller interfaces to a wide variety of air handling systems by using interchangeable air handling subsystems that plug into the controller. Each subsystem has the necessary hardware interface and software control methodology to easily and transparently enable the system controller to interface with a wide variety of air handling configurations. This flexibility allows the invention to control air handling systems using voltage or current outputs to control solenoid driven valves, dampers, and DC motors; and control air handler subsystems using phase, cycle, and frequency control of AC motors.

3 Claims, 10 Drawing Sheets

CONTROLLER TO MAINTAIN A CERTAIN SET OF ENVIRONMENTAL PARAMETERS IN AN ENVIRONMENT

This application is a continuation of application No. 08-343,639, filed Nov. 22, 1994, now abandoned.

BACKGROUND OF THE INVENTION

1. Field of the Invention

This invention generally relates to controlling air handling systems for environments. More specifically, this invention relates to precise differential pressure control of the air flow device for an environment's air handling system. The invention is used in manufacturing facilities, hospitals, and research institutions.

2. Description of the Related Art

Today's ever increasing complexity of manufactured products requires an ever higher need to create and maintain a cleaner manufacturing environment. To achieve such an environment, it is necessary to precisely control airflows so that we keep air within a cleaner environment flowing into a dirtier environment. By maintaining a slightly positive differential air pressure between a cleaner area and a dirtier area, air will flow from the cleaner environment to the dirtier environment. However, if the pressure difference is too great between the two environments, more air will try to cross the boundary between the environments and the greater air flow can cause turbulence in the environment. This turbulence can free contaminants in the cleaner environment from the walls or surfaces and can keep airborne contaminants lingering within the cleaner area much longer than would have been the case with a slight pressure due to eddies and non-laminar currents in the air stream. Therefore, the precise control of differential air pressure between two zones or environments can increase cleanliness and keep contaminants from entering the cleaner environment.

There are many manufacturing processes where it is extremely critical to prevent or control airborne contaminants from entering a particular environment so as not to contaminate the final product. For example, consider a typical mini-environment in a semiconductor manufacturing facility such as FIG. 2, which illustrates mini-environment 40 surrounding a typical piece of process equipment. An air handler consisting of fan filter unit 42 forces air through a HEPA filter to filter out airborne particulates. Generally, the air handler is set such that it provides a slightly more positive differential air pressure in the mini-environment than the outside room air pressure. The air flow flowing through the openings and vents in the equipment and the mini-environment is sufficient to keep outside contaminants from entering the mini-environment.

Another such application requiring a very clean or contaminant free environment is found in positive isolation rooms in hospitals. Such rooms are used to protect patients with highly depressed immune systems (a frequent side effect of AIDS for example). In these rooms, it is necessary to create a contaminant free environment that effectively prevents air from entering the room except through HEPA filters. Patients with depressed immune systems are unable to breathe the air from the general hospital environment because contracting an opportunistic infection from the air may prove fatal.

Another set of applications of differential pressure control is to exhaust harmful fumes or contaminated air from an environment. In these applications it is important that outside air flow into the contaminated environment and through a properly equipped exhaust system. An example of this type of application would be a chemical wet bench in a manufacturing plant. As illustrated in FIG. 3, the pressure under the hood would be slightly more negative than the pressure in the room. This would cause the air under the hood and on top of the bench to flow up through the exhaust vent. The exhausted air would then be treated by scrubbers or appropriate treatment systems. As in the above examples, it is important that this differential pressure be maintained in order to ensure that regardless of changing conditions within the room that the air be exhausted at a constant rate. If the exhaust rate is too slow, it can allow fumes to condense on the underside of the hood and then to 'rain' back into adjoining chemical baths thus contaminating process chemicals. If the differential pressure is too high it can cause turbulence in the airflow, possibly disrupting the exhaust such that fumes might actually be more likely to escape into the room.

A similar application in hospitals is the exhausting of respiratory illness rooms. In these rooms, patients with contagious respiratory illnesses like TB, must be isolated from the rest of the hospital and from each other. The pressure in their rooms must be kept more negative than the outside environment. That way, air travels from outside environments, like hallways, through the room and ideally is exhausted near the patient's head to be filtered and then re-released in the air outside and above the hospital. Should the differential between the room and the outside environment become positive, we run the risk of exposing staff and other patients to the illness carried in the air.

A further negative isolation application is in biological safety cabinets used by research institutions to isolate experiments from each other and from research personnel. In these cases, a properly operating hood over the experiment exhausts any airborne products of the experiment preventing cross contamination between experiments under the same hood, or experiments that share the same cabinet at different times. That arrangement will also protect personnel from being exposed to their experiments.

One major problem common to strategies for controlling the air flow in the above applications is that the differential air pressure between the controlled environment (such as in a mini-environment or in a room) and the outside or reference environment constantly changes. Fluctuations in the differential air pressure occur as a result of changes in the air pressure or air flow within the environment due to such events as people accessing the environment, by the operation of the air flow equipment itself; by varying loads on building air handling systems; by the loading of air filters over time; and even by the position and movement of people within the room or environment.

The prior art's attempt to control constantly changing differential air pressure used a variety of open-loop and closed-loop control solutions. Open-loop solutions include on/off switches, and manual speed control units like rheostats. Manual speed control devices are by far the most common form of control devices in air handling systems. Closed-loop solutions include such products as magne-helix and photo-helix type controllers that are passive, non-intelligent, and are generally insensitive at ultra-low pressures; and ultra-low differential pressure sensors connected to a centralized HVAC air control system that relies on distributed sensors and air handling techniques to distribute and balance air in large environments such as entire buildings, which by default make these large systems ill suited to precise local control of room or equipment environments. To account for randomly changing differential air pressure, industry practice is to periodically and manually increase the differential pressure for the controlled environment. Increasing the differential pressure, however, can cause turbulence within the environment, as well as requiring more power to operate the air handling equipment.

The present invention solves the constantly changing differential air pressure in a unique and novel product that continuously monitors the differential pressure between any two environments, and using closed loop control dynamically adjusts the local air handling system to maintain the desired differential pressure setpoint. A comparison of some of the above problems encountered with maintaining a desired differential air pressure setpoint with current air flow control products will illustrate the advantages of the present invention.

U.S. Pat. No. 5,257,958 to Jagers is a pressure override control for air treatment units. The Jagers patent prevents stale air by bringing in enough fresh air into a central HVAC system to induce a positive air pressure inside the building relative to the outside of the building. If the pressure is too low for too long in the building, this product starts the HVAC system to bring fresh air into the building using a bang-bang type of control strategy. This product uses temperature and differential pressure as inputs to control the mixing of fresh and recirculated air as part of the air recirculation—fresh air balance control. Since this product addresses HVAC applications and has a crude and imprecise control, it is not very adaptable to smaller environments or even individual rooms. The Jagers patent addresses the problem of stale air; not precise local control of differential air pressure. The present invention, however, maintains a desired differential pressure setpoint for a local environment. Its focus is on local control of air pressure; not on better balancing of a global air handling system, although its inclusion in a global system will help better manage global airflows by handling critical areas more discretely than is done currently.

Another current control product, U.S. Pat. No. 5,115,728 to Ahmed et al., controls the differential pressure of rooms with laboratory fume hoods. This patent maintains a constant face velocity for a fume hood by monitoring the position of the fume hood sash (variable opening or moveable door) and sending control signals to an external HVAC controller to help it maintain a desired hood and room pressure. Like the Jagers patent above, this patent relies on the building's HVAC system to maintain control over these differential pressures. The position of the hood's sash is critical for this patent to maintain a low pressure by only using negative pressure. Additionally, this patent then connects multiple fume hoods together and transmits the sash information along with room information to a central building controller. The central building controller must then attempt to meet the control requirements of the individual units as best it can by making tradeoffs and adjustments for each unit, sometimes at the expense of other units.

The present invention, however, uses negative and positive pressure to maintain a set differential pressure across a large range of pressures for a wide variety of applications, not just for fume hoods. The present invention can control a variety of air flow devices such as fans, pumps, compressors, dampers, valves, and the like, directly. By controlling the airflow device directly, this invention does not need to send control signals to the HVAC system, and can control the pressure of the room without the help of an additional controller. The present invention is not merely a repackaging or an integration issue. It is a fully integrated local controller having the means to sense and to affect local control of an environment based on desired parameters. The present invention can operate independently of a large centralized air handling system or be used in conjunction with such a system in order to meet critical air handling requirements. When used in a hybrid system with an HVAC system, the present invention provides precise control over a local environment, leaving the big picture to the larger system.

Returning to the multiple fume hoods of the Ahmed patent, we can use the present invention to control multiple fume hoods by having an individual unit of the present invention on each fume hood. A separate unit provides local control of the differential pressure of that individual fume hood. Another unit of the present invention would separately control the room pressure using either positive or negative pressure, and would ignore the controllers on the fume hoods by monitoring the room pressure directly. Controlling the room pressure in this manner will compensate for any and all air leaks from the room including doors and windows, instead of just fume hoods.

OBJECT AND SUMMARY OF THE INVENTION

An object of the invention is to provide more precise dynamic local control of air handlers across a wide variety wide of pressure ranges, from ultra-low pressure environments ((0.1" $H_2O$ full scale) to compressed air (>100 psi).

Another object of the invention is to provide a controller so flexible that the invention is suitable for a wide variety of applications.

A feature of the invention is to provide interfaces to a wide variety of air handlers, including: DC fans, single and 3 phase AC fans and blowers, solenoid driven valves and dampers, and air compressors. This flexibility allows the invention to be used with existing air control products in a larger number of applications.

Another feature of the invention is to provide flexible interfaces allowing monitoring and configuration from local and remote sources.

An advantage of the invention is that precise dynamic local control greatly improves performance by making the air handling more accurate, more efficient, and more effective.

Another advantage of the invention is that the user can remotely monitor and configure the invention. It can be connected directly to a monitoring and control system, or an entire network of these inventions can be connected together via such a system to give access to all units across the entire facility.

The present invention, the Intelligent Differential Pressure (IDP) controller, continuously monitors differential pressure between two environments, the controlled environment and the reference environment. The IDP dynamically adjusts the air handling system to maintain a desired differential pressure setpoint between the two environments. Initially, a user configures the IDP to a specific application, which includes setting a desired differential pressure setpoint. When operating, the IDP uses an internal sensor to monitor the current differential pressure between the controlled environment and the reference environment. The IDP uses closed loop control to adjust the air handling system in order to maintain the desired setpoint. The invention is very flexible because it interfaces to a wide of variety of air handling systems. To achieve such flexibility, the IDP has modular air handler subsystems that interface and connect the IDP's system controller to various air handling systems. For example, the IDP has air handler subsystems for using voltage or current outputs to control solenoid driven valves, dampers, DC fans, and air compressors; and the IDP has air handler subsystems for phase, cycle, and frequency control of AC fans. Each air handler subsystem has the necessary hardware interface and software control methodology to allow the system controller to interface easily and transparently with a wide variety of commercial air handling systems.

DESCRIPTION OF THE DRAWINGS

To further aid in understanding the invention, the attached drawings help illustrate specific features of the invention. The following is a brief description of the attached drawings.

DETAILED DESCRIPTION OF THE INVENTION

Consideration of the following example further clarifies the use of the invention.

The present invention, the Intelligent Differential Pressure (IDP) controller, using sensor feedback, dynamically maintains a desired differential air pressure between any two environments, the controlled environment and the reference environment. The IDP provides a novel method and apparatus for controlling the airflow device of an environment's air handling system. A detailed description of the Intelligent Differential Pressure controller appears in the LIGHTHOUSE ASSOCIATES, INTELLIGENT DIFFERENTIAL PRESSURE CONTROLLER GUIDE IDP V3.0e (Nov. 15, 1994), incorporated herein by reference. To allow the IDP to interface to a wide range of commercial air handlers, the IDP consists of two pasts, a system controller and an air handler subsystem. Manufacturers currently use their large centralized HVAC systems, which are difficult to balance, to attempt to maintain ultra-low differential pressures for smaller environments such as rooms or individual pieces of equipment.

Figure 1:
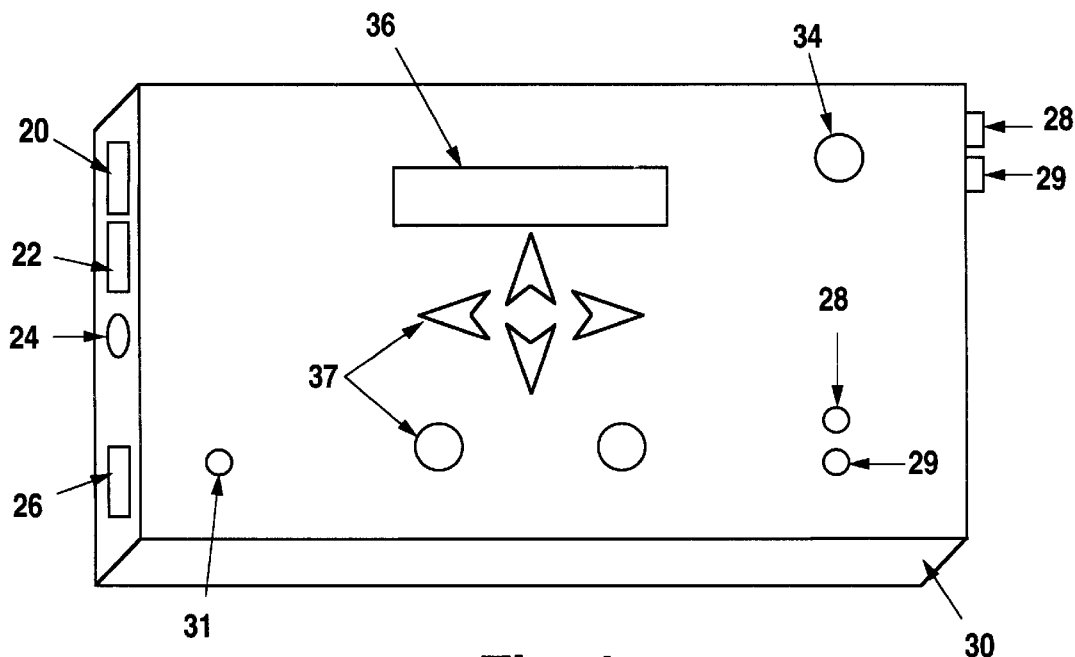
FIG. 1 is a perspective view of the invention.

FIG. 1 is a perspective view of an embodiment of the present invention, an IDP controller 30. The electrical connections include air handler subsystem output 20, AC power input 22, fuse 24, and external interface connector 26. Status LED 31 currently includes a power light showing that the IDP is receiving external power, and will blink in the case of internal errors. Alarm lamp 34 signals when the pressure is too high or too low. Most applications will use the internal differential pressure sensor ports 28 (high pressure port) and 29 (low pressure port) to monitor differential pressure. The IDP comes with these ports mounted either on the face of the controller or on the side of the controller with FIG. 1 showing both locations for simplicity.

Besides monitoring differential air pressure, the IDP can also monitor other environmental parameters such as temperature, humidity, or particulates by connecting the appropriate type of sensor into external interface connector 26. The setup and operation of the IDP when configured to monitor other environmental parameters is the same as when the IDP is monitoring differential pressure. As a result, the use of differential pressure as the monitored environmental parameter is exemplary only so that the description and operation of the IDP provided in this application applies equally well to use of other environmental parameters for monitoring.

For user control, the IDP has a local microprocessor with both local and remote interfaces to adjust the control, setpoints, configuration, and other operating parameters of the unit. Local configuration is through LCD display 36 and keypad 37. Remote configuration using a terminal or remote computer is available through external interface connector 26 in either a point-to-point mode (RS-232) or multidrop mode (RS-485). The IDP interfaces to a wide variety of air handling systems through air handler subsystem output 20 by using modular and customizable air handling subsystem interfaces. Each subsystem interface has the necessary hardware interface and software control methodology to enable the IDP to interface easily and transparently with a particular type of air handler. The IDP can, for example, control air handlers by regulating the air handlers power input. In a typical configuration, IDP 30 receives external AC power into AC power input 22. The IDP controller then supplies power to the air handler through air handler subsystem interface output 20. Other air handling subsystems allow the IDP to control solenoid driven valves, dampers, DC motors, and AC motors using a variety of techniques.

Figure 2:
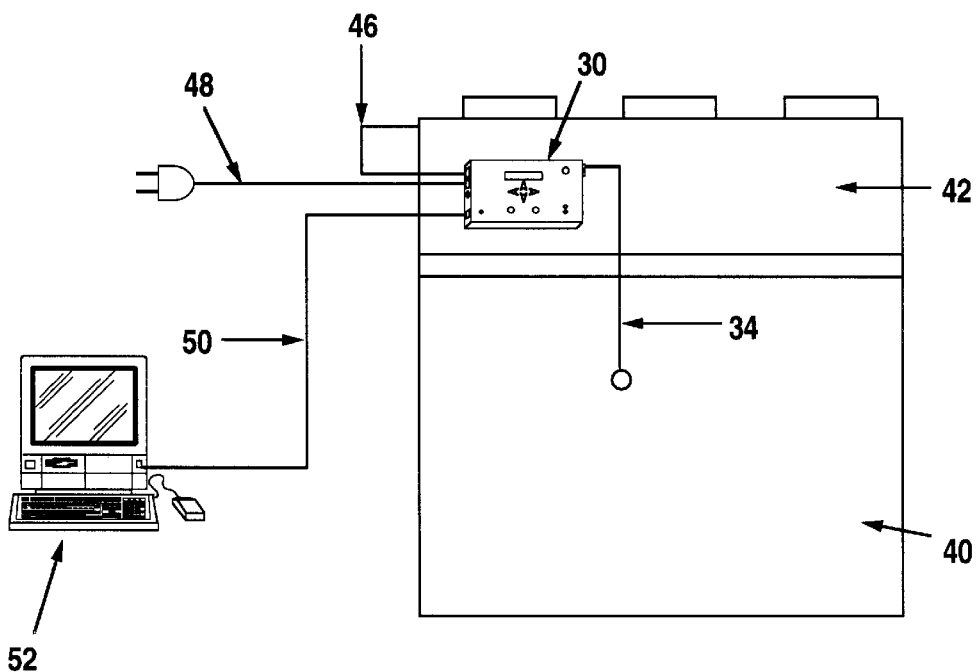
FIG. 2 shows an embodiment of the invention on a mini-environment.

FIG. 2 shows an IDP in a typical mini-environment application. IDP 30 mounts on or near mini-environment 40. The air handling system of mini-environment 40 is fan filter unit 42. For this example, we want to maintain a desired positive pressure inside mini-environment 40 relative to the pressure outside mini-environment 40 to force the outside air to enter mini-environment 40 solely through fan filter unit 42. The IDP monitors the pressure inside the mini-environment by connecting tube 34 from high pressure sensor port 28 (of FIG. 1) to inside the enclosure of mini-environment 40. We leave low pressure sensor port 29 (of FIG. 1) open so as to read the pressure from outside mini-environment 40. The low pressure reference port can also have a tube connected to it to find a more appropriate reference in the event that the IDP is located directly in some airflow. In this example, the environment inside mini-environment 40 is our controlled environment, and the environment outside mini-environment 40, the room itself, is our reference environment. IDP 30 draws power from external AC power line 48. Fan filter unit 42 receives its power from the IDP's air handler subsystem output interface (20 of FIG. 1) through fan power cable 46.

We can configure the IDP through its local user interface or from remote computer 52 through communications cable 50 to external interface connector 26 (of FIG. 1). We can also monitor the activity of the IDP as well as receive alarms and sensor values with remote computer 52. When activated, the IDP will control the speed of the fan(s) in fan filter unit 42 to maintain a desired differential pressure setpoint inside mini-environment 40 in spite of doors on the mini-environment being opened and closed, air leaking, or the filter in fan filter unit 42 becoming dirty and restrictive to air flow.

Returning to our example, we set the upper threshold (or alarm condition) at 0.020"$H_2O$, the lower threshold (or alarm condition) at 0.001"$H_2O$, and the setpoint on the IDP to 0.005"$H_2O$. This setting means that we want to maintain a differential pressure of 0.005"$H_2O$ between the controlled environment (inside mini-environment 40) and the reference environment (outside mini-environment 40). The IDP uses a form of the standard PID control algorithm for its process control methodology. For this example, we configure the PID control terms (or weights) to this particular environment with the following values: Proportional=0.1, Integral=0.2, and Derivative=0.5. By setting our sensor sample rate at half a second, we will read the differential pressure twice a second and then use the PID control algorithm to calculate the proper fan speed for fan filter 42 in order to maintain our desired differential pressure setpoint.

Figure 3:
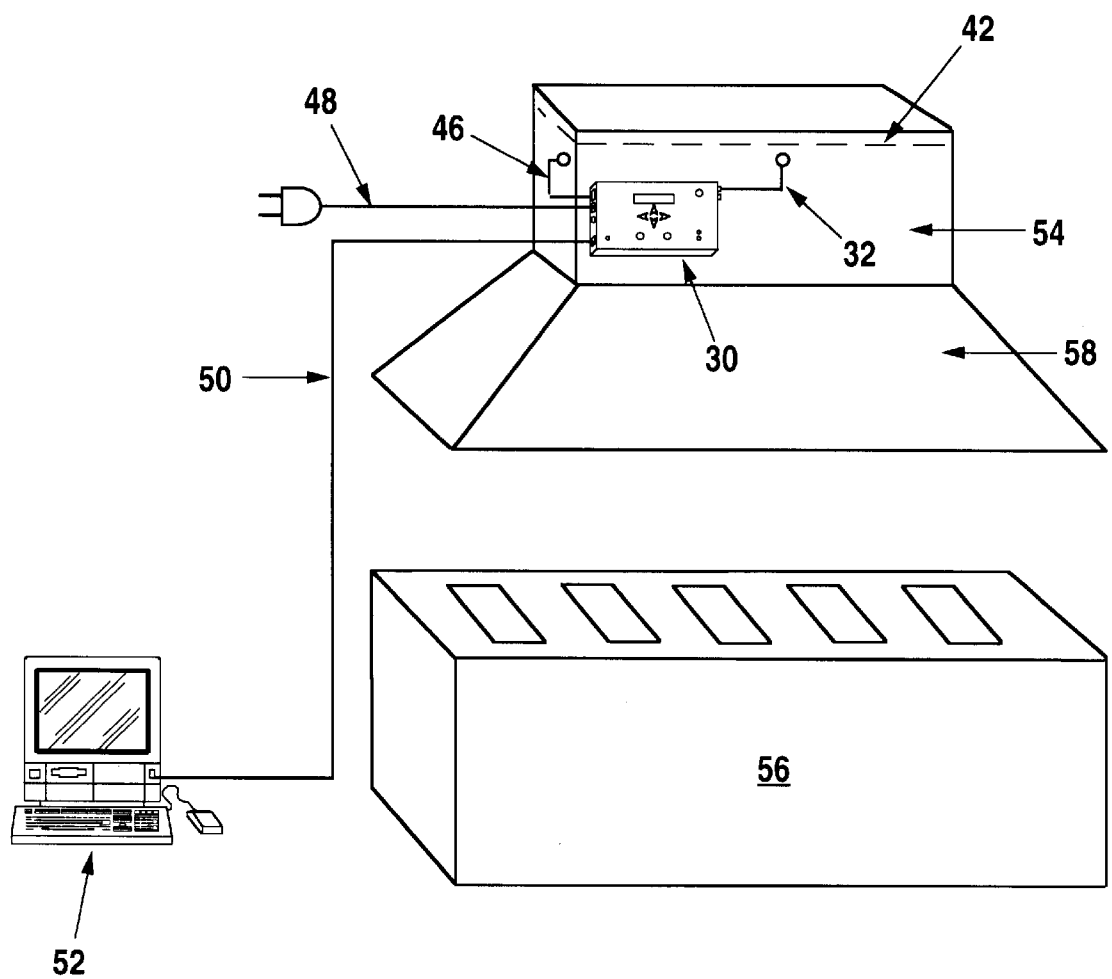
FIG. 3 shows an embodiment of the invention on a wet-bench.

FIG. 3 shows an implementation of the IDP for a wet-bench. We mount IDP 30 on or near exhaust hood 58 of wet bench 56 with low pressure port 29 connected through tube 32 to the inside of the exhaust duct 54. The low pressure port input needs to be before fan or damper 42, and before any filters, scrubbers, or junctions in exhaust duct 54. Locating the input here allows us to monitor the pressure from the fumes on this side of the filter. In this example, we want to maintain a desired negative pressure setpoint under exhaust hood 58 relative to the room pressure. This configuration will maintain the desired air flow from the room through exhaust hood 58 and on through duct 54 regardless of other equipment exhausting into a common exhaust duct such as duct 54, the room pressure changing due to doors opening and closing, or how clogged the fan filter may become. IDP 30 draws power from external AC power line 48 and provides power to duct fan or damper 42 through power cable 46. We can configure the IDP through its local user interface or from remote computer 52 through communications cable 50 Again, this is just one example of many configurations for using an IDP to maintain desired air flow or differential air pressure.

Figure 4:
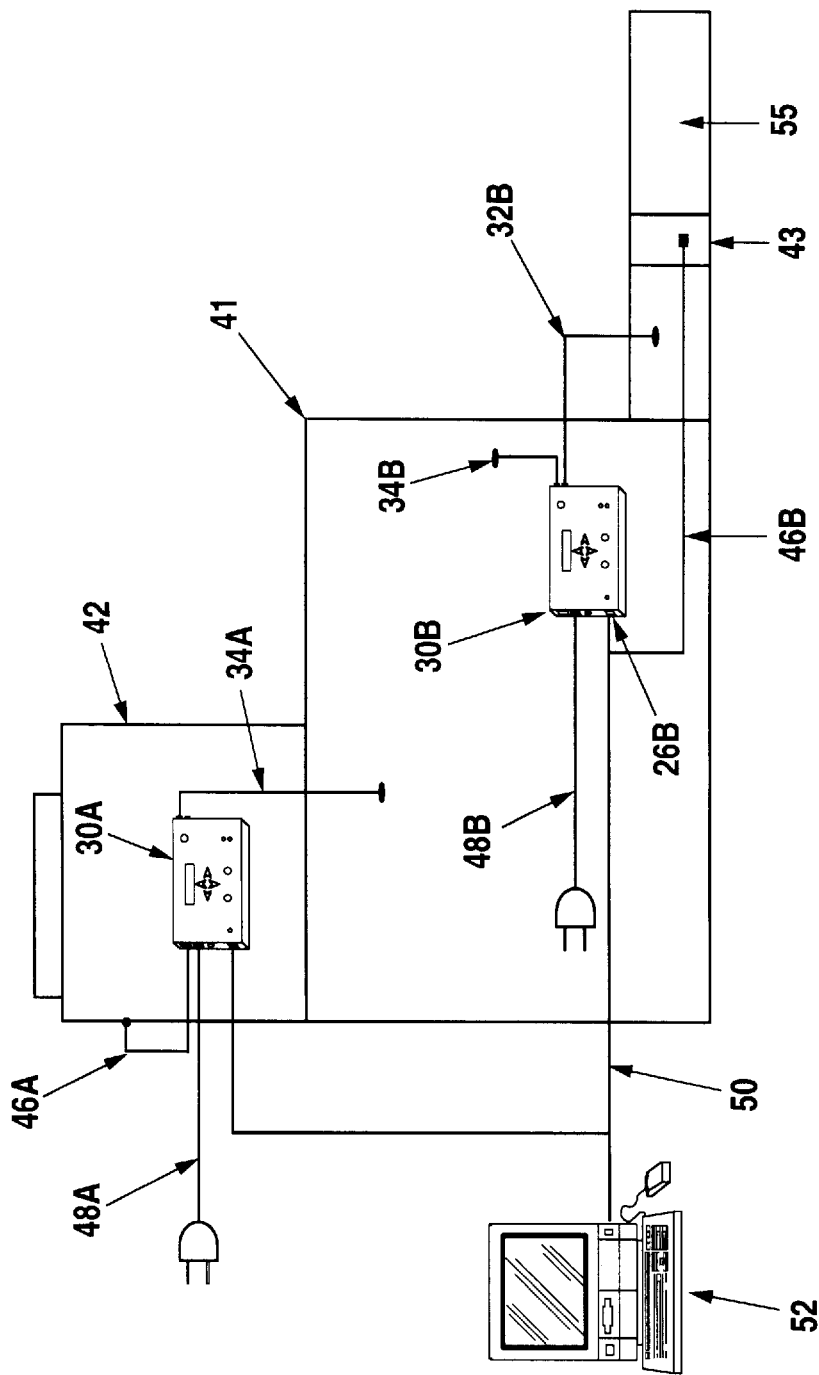
FIG. 4 shows an embodiment of the invention with intake and exhaust control.

FIG. 4 shows two IDP controllers used in tandem for intake and exhaust control. IDP 30A controls the air supply (intake) and IDP30B controls the air exhaust. We configure IDP 30A similar to that of FIG. 2 for normal operation of mini-environment 41. IDP 30B's configuration is similar except that it controls the exhausting of mini-environment 41. We can use this tandem configuration on process equipment with critical air handling requirements. In installations where the exhaust system is unreliable and where the air flow in the exhaust line can vary greatly and even get reversed, a single IDP might find a situation where the IDP would start backing off the supply when the exhaust line reversed side with the differential pressure between the room and the mini-environment rising because of the incoming exhaust air, thus allowing the mini-environment to become compromised by the dirtier exhaust air. By using two IDPs, as in this example, the exhaust unit 30B manages the differential air pressure between mini-environment 41 and exhaust duct 55, and keeps the air moving out of mini-environment 41 regardless of what the conditions are in the duct itself. The supply IDP 30A now only has the responsibility to keep the air moving from mini-environment 41 to the room. The only communication between the units is via differential pressure. The control parameters in both of the IDPs can be adjusted to make one more aggressive or less responsive, and thereby decide by virtue of the control parameters which unit will respond to minor adjustments. We can configure both IDP controllers through their local user interfaces or from remote computer 52.

Supply IDP 30A has its high pressure port connected through tube 34A to enclosed space 41, and works to maintain a desired differential pressure setpoint between mini-environment 41 and the room (the reference environment). Supply IDP 30A gets its power from external AC power line 48A and provides power to fan filter unit 42 through fan power cable 46A. When activated, supply IDP 30A will control the speed of the fan(s) in fan filter unit 42 by regulating the power drawn by the unit to maintain the desired differential pressure inside enclosed space 41 in spite of doors on the mini-environment being opened and closed, leaking air, the filter in fan filter unit 42 becoming dirty and restrictive to air flow, or the exhaust controller causing flow changes.

Exhaust IDP 30B has its high pressure port connected through tube 34B inside enclosed space 41, and its low pressure port connected through tube 32B into exhaust duct 55. The exhaust IDP works to maintain the desired differential pressure setpoint between the mini-environment and the exhaust duct, in order to keep the air flowing out of the mini-environment. Exhaust IDP 30B receives power from external AC power line 48B and provides power to solenoid controlled valve 43 through power cable 46B. When activated, exhaust IDP 30B will control solenoid valve 43 to maintain the desired differential pressure in exhaust duct 55 relative to enclosed space 41 to maintain the desired air flow in spite of the supply controller 30A causing pressure changes inside enclosed space 41 or other equipment exhausting into the common duct.

Figure 5:
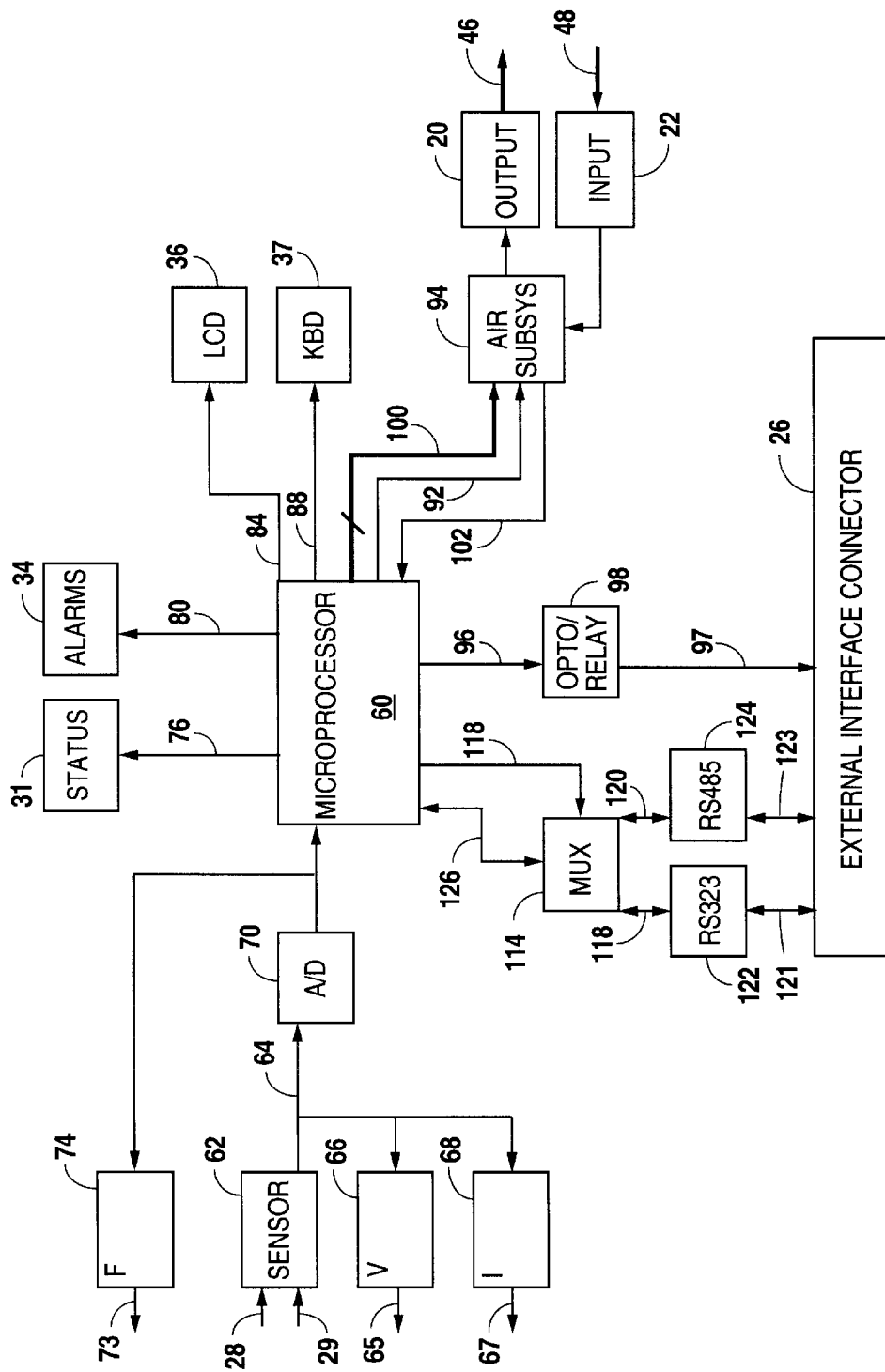
FIG. 5 is hardware block diagram of one embodiment of the invention.

FIG. 5 is the hardware block diagram of the IDP's system controller. The system controller uses microcontroller 60, which could be an Intel 86C32 for example, to perform all processing functions that include receiving user configuration and storing the configuration in non-volatile memory, reading the current sensor value, performing the PID calculations, managing alarms, and interfacing with the air handler subsystem. The system controller begins with differential pressure sensor 62 with high pressure sensor port 28 and low pressure sensor port 29. In the preferred example, differential pressure sensor 62 provides an analog signal proportional to the measured differential pressure as signal 64. This signal is buffered via buffer 66 and made available as a 0–5 v analog output 65. This signal is also available as a 4–20 ma analog output via 4–20 ma converter 68 and the output signal being 67. Finally signal 64 also is distributed to a voltage to frequency converter 70 which outputs a 0–10khz digital signal 72. This 0–10khz digital signal 72 is output using a differential driver 74 (RS-422/RS-485) as signal 73 that is suitable for connection to a number of data collection systems. Microcontroller 60 receives the 0–10khz signal 72 into its on-board 16 bit counter. Every tenth of a second, microcontroller 60 reads the counts received from sensor 62 and adds these to a running sum. Once we have accumulated counts for the desired sample interval (which can be setup by the user) the current differential pressure is calculated for the interval and recorded for use by other routines. The system controller uses this new pressure reading to determine the alarm status, to update the display and to calculate the new air handler adjustment for the air handler subsystem.

The alarm status is communicated by signals 80 and 96. Signal 80 will drive local alarm lamp 34, and signal 96 will drive opto-isolator 98 that isolates external signal 97, which is available on external interface connector 26. The system controller generates an alarm if the measured differential pressure is above the upper alarm threshold or below the lower alarm threshold.

Microcontroller 60 has a status output that gives feedback on internal operation. Signal 76 drives status LED 31, which remains on steady to indicate a power on condition when there are no internal errors. If an internal error occurs, status signal 76 pulses making status LED 31 blink to signal the error state. The signal will continue to pulse until the internal error is cleared by the user.

Microcontroller 60 manages the local user interface via LCD display 36 connected through cable 84, and keypad 37 connected by cable 88. It manages the remote user interface via its serial interfaces on the external interface connector 26. Microcontroller 60 uses mux 114 to select whether to receive information from external interface connector 26 via RS232 serial interface 122 or RS485 serial interface 124.

Finally, microcontroller 60 communicates with the appropriate air handler control subsystem through air handler control subsystem 94. Air handler control subsystem 94 is the modular interface between the system controller and the air handler. Subsystem 94 has its own microcontroller that is separate and distinct from microcontroller 60, which controls the system controller. Microcontroller 60 provides subsystem 94 with a control output on bus 100 to control the current setting of the particular air handler. Subsystem 94 translates the control output word into the appropriate control outputs for the air handler in question. Clock line 92 provides timing information to the subsystem in addition to providing a health status check as well. If subsystem 94 does not receive a health status check periodically, the subsystem will reset itself and microcontroller 60 via reset signal 102. And finally, the subsystem provides power to the air handler through output 20 (from FIG. 1).

Figure 6:
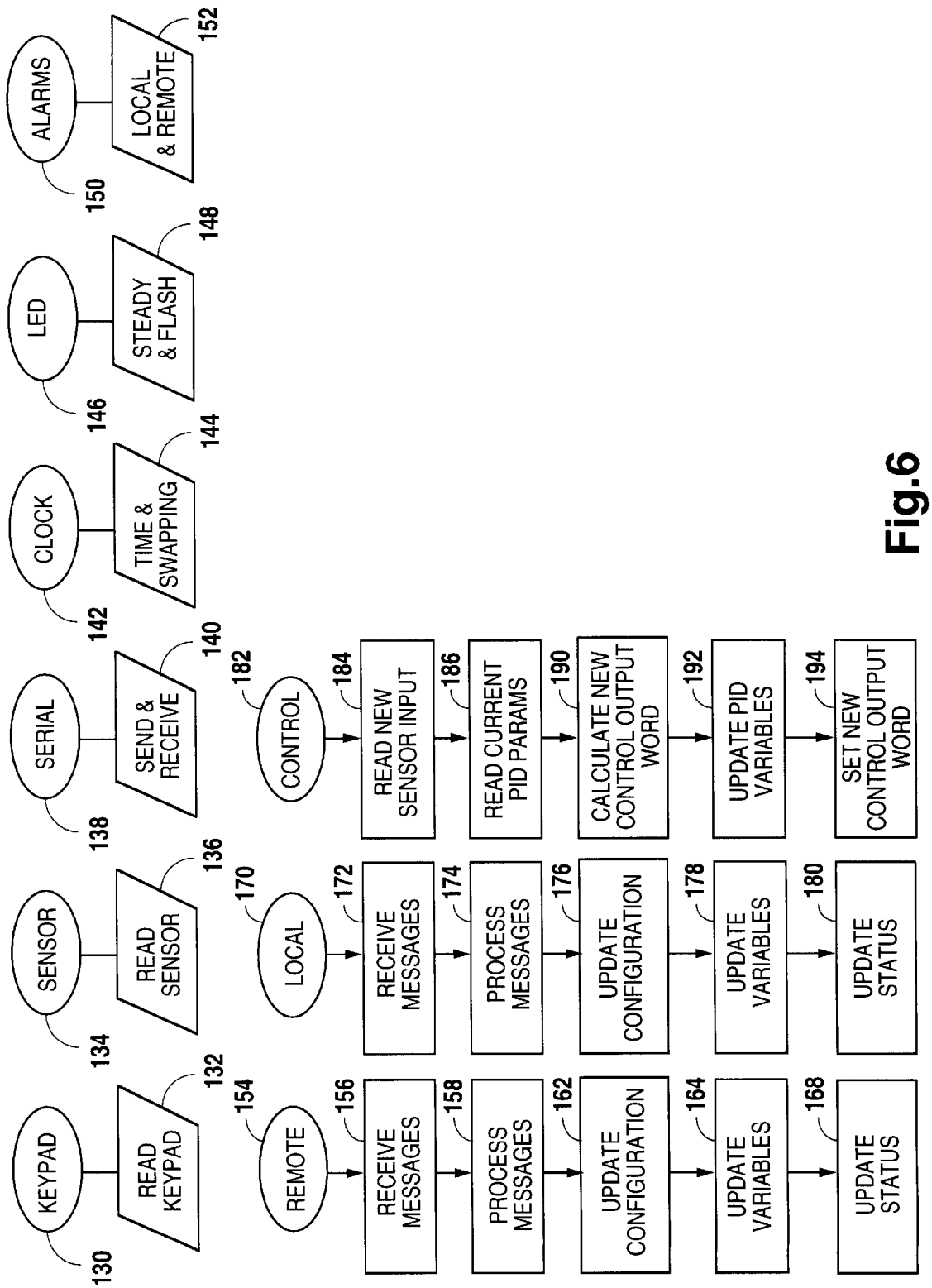
FIG. 6 is a software diagram of one embodiment of the invention.

FIG. 6 is the software block diagram for the system controller with the preferred embodiment including nine independent tasks, which are the following:

1. KEYPAD task 130 has function 132 of reading the local user keypad, software debouncing the keys, and putting the keys pressed in a buffer for access by other tasks.
2. SENSOR task 134 has function 136 of reading the internal sensor input at a user specified rate and making those values available to other tasks.
3. SERIAL task 138 has function 140 of receiving serial information and making this information available for other tasks to access.
4. CLOCK task 142 has function 144 of monitoring an internal time base of 50 ms, and it also schedules the KEYPAD, SENSOR, and LED tasks.
5. LED task 146 has function 148 of controlling status LED 31 (of FIG. 1).
6. ALARMS task 150 has function 152 of controlling local alarm(s) 34 (of FIG. 5) and external alarm output 97 (of FIG. 5).
7. REMOTE function 154 communicates with a remote user via external interface connector 26 (of FIG. 5). Function 154 receives messages 156 from a remote user, it parses these messages and processes them 158, it allows updates to the IDP's configuration including PID constants when instructed 162, updates the IDP's local variables 164, and sends messages and updates status 166 to the remote user.
8. LOCAL function 170 communicates with a local user through the local user interface 36 and 37 (of FIG. 5). It receives the local user input 172, processes the user input 174, updates the IDP's configuration including PID constants when instructed 176, updates the IDP's local variables 178, and sends messages and updates status to the local user 180.
9. CONTROL function 182 performs the control methodology of the IDP. This function reads the new sensor inputs (from the differential pressure sensor task) 184. The function then reads the current PID parameters 186, and executes the PID control strategy to compute the new control output word 190, updates the PID variables 192, and sends the new control output word 194 to air handling subsystem 94 (of FIG. 5).

The preferred embodiment of the IDP uses a modified form of the standard PID control algorithm with upper and lower limits on the value of the control output, and limits on the $K_i$ term in the event of output saturation. The standard PID equation is:

$$u(t) = K_p e(t) + K_i \int_0^t e(\tau)d\tau + K_d \frac{de}{dt} \tag{1}$$

where $K_p$, $K_i$, and $K_d$ are the Proportional, Integral, and Derivative terms Our implementation for the above algorithm is the following C code fragment:

```
void ctl_update(void)
{
  int ctl_error;
  long ctl_temp;
  if (nvm_ctl_mode == CTL_MODE_FIXED) {          // If we are in manual mode
     ctl_current =   nvm_ctl_fix_val;            // then copy fixed setting
     CTL_ADDR    = (BYTE)nvm_ctl_fix_val;        // into current val, write
     return;                                     // the fixed value to ctrlr,
  }                                              // and RETURN.
  if (ctl_count != prs_count) {                  // In auto mode calculate
     ctl_count = prs_count;                      // output value using PID.
     if (nvm_ctl_pressure == CTL_PRS_POSITIVE)   // Calculate error based on
        ctl_error = nvm_set_pressure -prs_current; // whether it is a positive
     else                                        // or negative pressure area
        ctl_error = prs_current -nvm_set_pressure;
     if (ctl_current >= nvm_ctl_max_val)         // Adjust err_sum, if we are
        ctl_errsum -= ctl_error;                 // in saturation back off
     else                                        // until we reach the edge
        ctl_errsum += ctl_error                  // otherwise add the error
                                                 // Do not allow sum to wrap
```

```
        if (ctl_errsum > CTL_SUM_MAX) ctl_errsum = CTL_SUM_MAX;
        if (ctl_errsum < CTL_SUM_MIN) ctl_errsum = CTL_SUM_MIN;
        ctl_temp = 0L;                                              // Start with output at 0
        //////////////////////Calculate P portion//////////////////////
        ctl_temp += (long)ctl_error * nvm_ctl_term_p;
        //////////////////////Calculate I portion//////////////////////
        ctl_temp += (long)ctl_errsum * nvm_ctl_term_i;
        //////////////////////Calculate D portion//////////////////////
        ctl_temp += (long)(ctl_error - ctl_errprv) * nvm_ctl_term_d;
        ctl_temp += 50;                                             // Terms have 2 implied
        ctl_temp /= 100;                                            // decimal places 9.99
        //////////////////////Adjust for Max/Min//////////////////////
        if    (ctl_temp < nvm_ctl_min_val)   ctl_current = nvm_ctl_min_val;
        else if (ctl_temp > nvm_ctl_max_val) ctl_current = nvm_ctl_max_val;
        else                           ctl_current = (int)ctl_temp;

// Setup for next pass by
        ctl_errprv = ctl_error;                                     // updating previous_error
        CTL_ADDR = (BYTE)ctl_current;                               // Write new ctrlr value
    }
}
```

Figure 7:
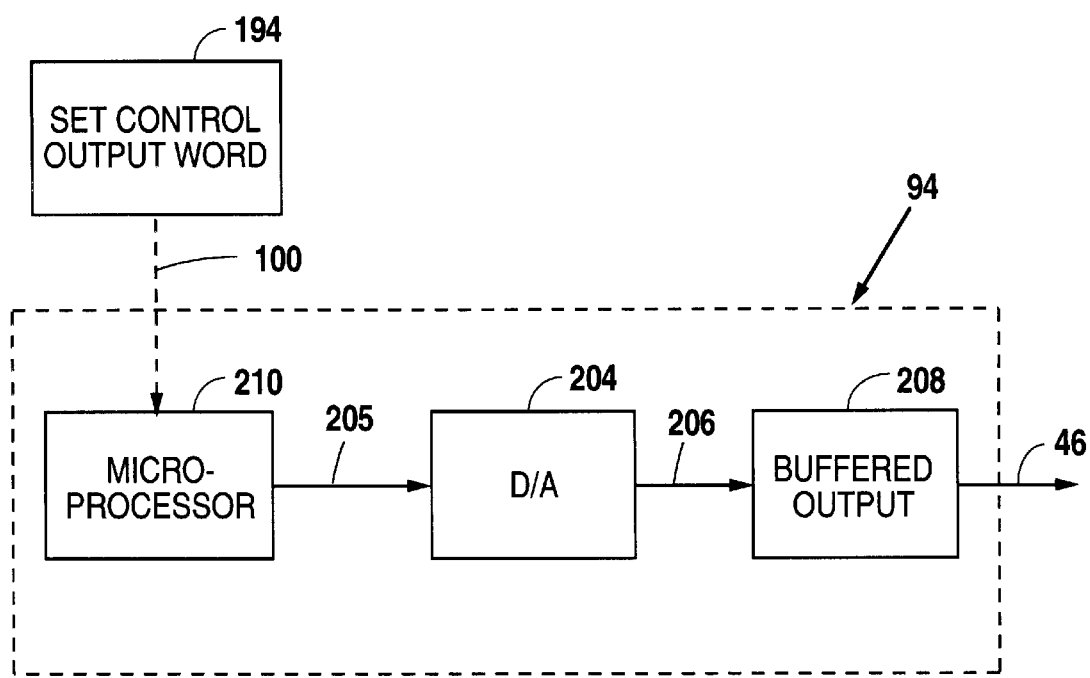
FIG. 7 shows an air handler subsystem for solenoid based valve and damper control or DC fan control.

FIG. 7 is a hardware block diagram for an air handler control subsystem for controlling air flow devices with DC motors, solenoid driven valves, dampers, and air compressors that require either a controlled voltage input or controlled current input. When CONTROL task 182 sets control output word 194, microprocessor 210 enables digital-to-analog (D/A) converter 204 to set DC voltage 206. D/A converter 204 can be of any type including multibit linear converters and single-bit pulse-width-modulating (PWM) converters. Buffer 208 converts DC voltage 206 to either a controlled voltage output or controlled current output. The gain of D/A converter 204 and buffer 208 are chosen such that the output will match the expected range of the air handler system we are controlling.

Figure 8B:
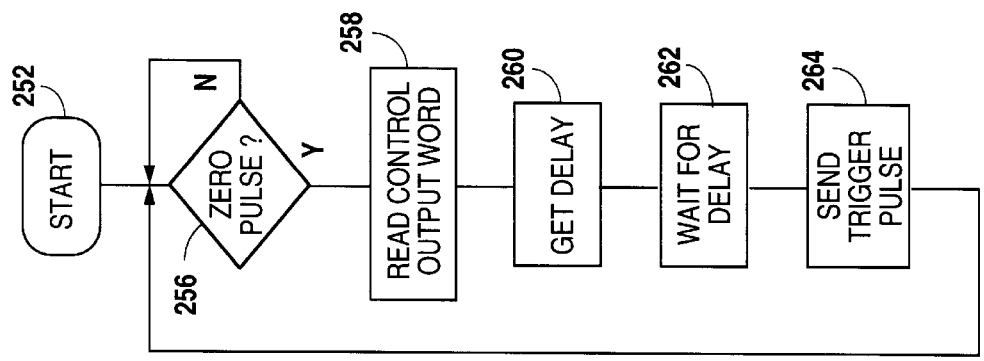
FIG. 8A, 8B, 8C illustrates an air handler subsystem for phase control of an AC fan.
Figure 8A:
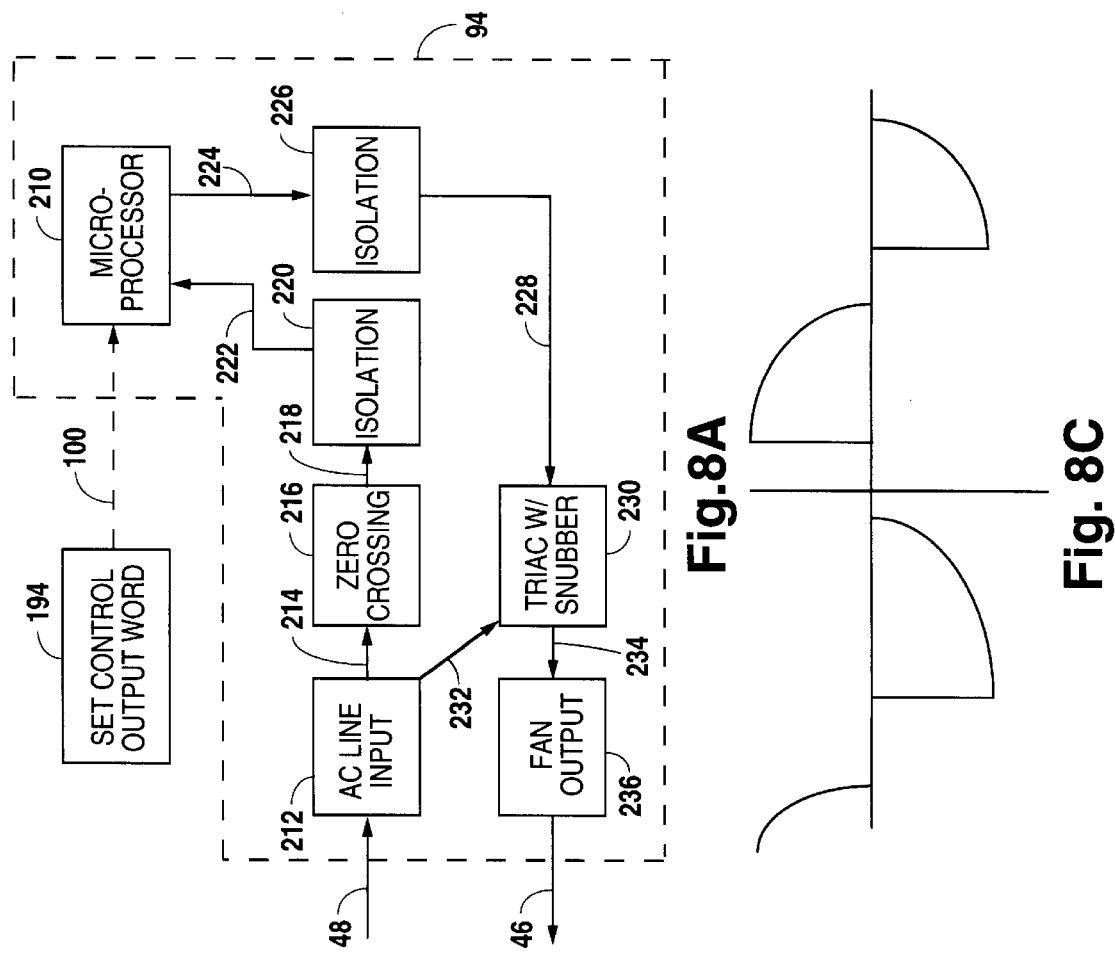
Figure 8C:
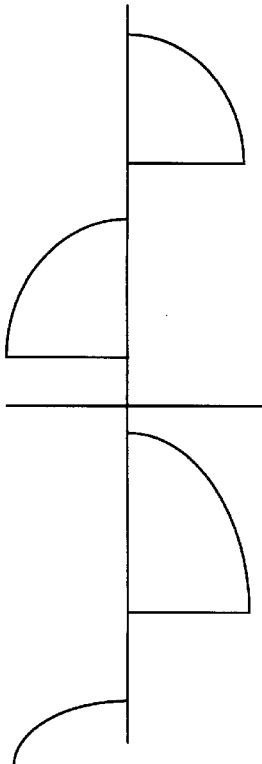

FIG. 8 is a block diagram an air handler control subsystem 94 for phase control of an AC fan motor. This subsystem controls the AC power sent to an AC fan motor by sending part of the line waveform to the motor. Every time the input power line voltage crosses 0V, the IDP waits for a delay period inversely proportional to the power level desired for the AC fan before connecting the input line voltage to the motor for the rest of that half-cycle. FIG. 8A is the hardware block diagram, FIG. 8B is the software block diagram, and FIG. 8C is a sample output waveform for this air handler subsystem.

AC line input 212 receives power from external AC power line 48, and sends AC signal 214 to zero crossing detector 216. When AC signal 214 crosses 0V on either slope of the AC waveform, zero crossing detector 216 sends pulse 218 to microcontroller 210 through optically isolated buffer 220. Upon receipt of pulse 218, microcontroller 210 reads current output control word 194 and delays for a period inversely proportional to control word 194. Once this delay expires, microcontroller 210 sends gate signal 224 through opto-isolator 226. Isolated signal 228 then drives a triac and snubber circuit 230 to turn on the AC air handler output 236 for the remaining portion of the AC half-cycle.

The control task for this subsystem waits for zero pulse detection 256 from pulse 218 informing us that the AC power signal crossed 0V. After receiving zero pulse detection 256, microcontroller 210 reads current control output word 194 and calculates the delay, which is inversely proportional to the control output word. Microcontroller 210 then waits for delay period 262 to expire. Once delay 262 has expired, microcontroller 210 sends trigger pulse 264 to start the AC motor for the remainder of the current AC half-cycle.

Figure 9B:
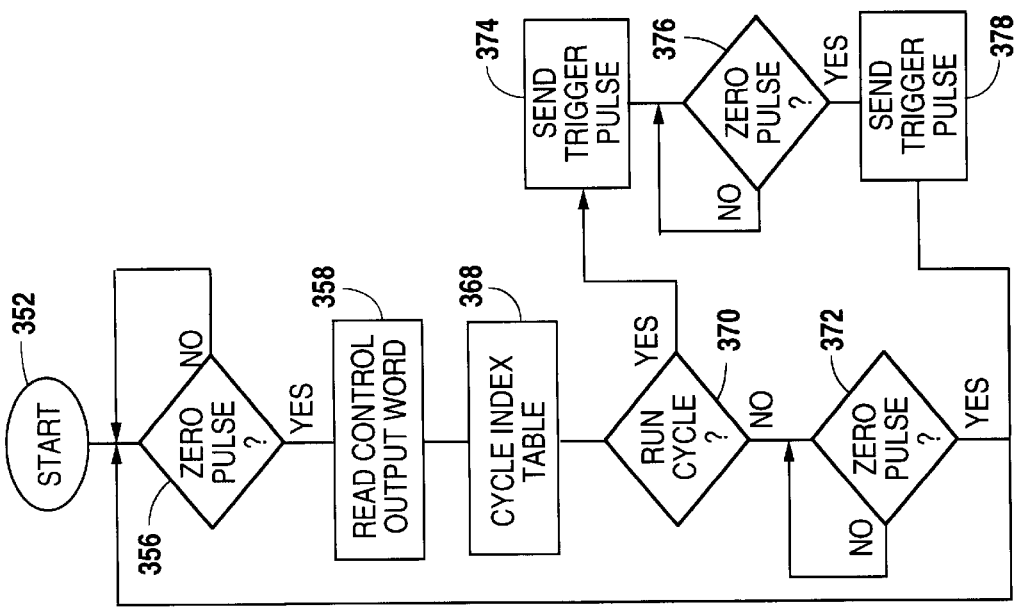
FIG. 9A, 9B, 9C illustrates an air handler subsystem for cycle control of an AC fan.
Figure 9A:
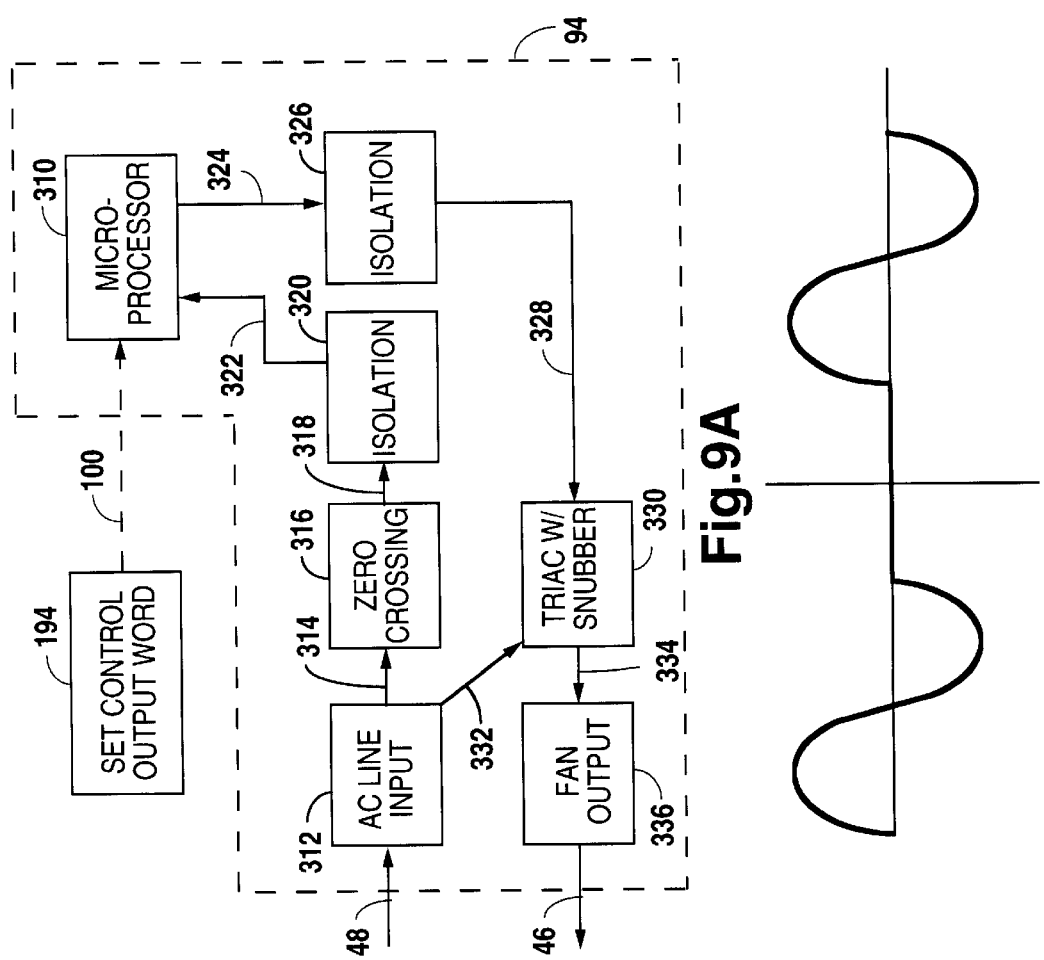
Figure 9C:
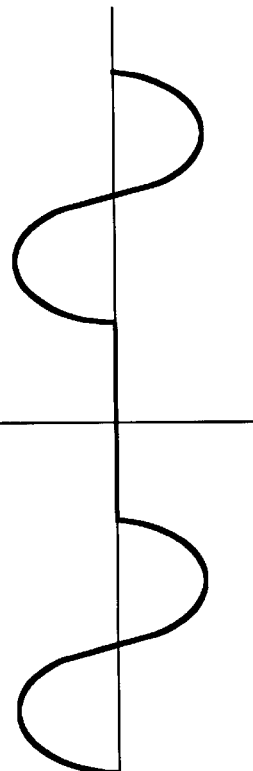

FIG. 9 is a block diagram of an air handler control subsystem for cycle control of an AC motor. This subsystem controls the power sent to an AC motor by sending whole cycles of the AC line waveform to the motor. Every time the AC line voltage crosses 0V, the subsystem determines whether to skip a cycle before connecting the AC line voltage to the motor for that full cycle. Some types of AC motors do not like phase control but do like cycle control and vice versa. FIG. 9A is the hardware block diagram, FIG. 9B is the software block diagram, and FIG. 9C is a sample output waveform for this air handler subsystem.

AC line input 312 receives power from external AC power line 48, and sends AC signal 314 to zero crossing detector 316. When AC signal 314 crosses 0V on either slope of the AC waveform, zero crossing detector 316 sends pulse 318 to microcontroller 310 through optically isolated buffer 320. Upon receipt of pulse 318, microcontroller 310 reads current control output word 194. Microcontroller 310 checks an internal table against control output word 194, and if match occurs, gate signal 324 is sent through opto-isolator 326. Isolated signal 328 then drives triac and snubber circuit 330 to turn on the AC air handler output 236 for this half-cycle.

The control task 352 for this subsystem waits for zero pulse detection 356 from pulse 318, which informs us that the A signal crossed 0 V. After receiving zero pulse detection 356, microcontroller 310 retrieves current control output word 194 and checks it against cycle index table 368. Microcontroller 310 maintains a cycle index table that has as many entries as the number of discrete control words possible. If the control word is 8 bits, there would then be 256 entries in the table. Each entry in the cycle index table is a byte mask outlining which values of the control word will run for this entry. An index moves through the entries one cycle at a time and checks the current control output word against the current cycle mask entry in the table. If the two values ANDed together return TRUE, then the cycle is run 370. If one half-cycle is run 374 from the table, then the next half-cycle 376 is automatically run 378 since AC motors only want to see full cycles and not half-cycles. In the same manner, if the current half-cycle is not run then we throw away the next half-cycle 372.

After extensive testing of cycle controlling an AC motor, we discovered that this order of entries in the cycle index table produces a more efficient distribution of power to the AC motor with the added benefit of minimizing heat in the AC motor. The implementation of the cycle index table can be illustrated by the following table, implemented below in the C programming language.

```
BYTE cycle_table[]= {
    0x80,0x80,0x80,0x80,0x40,0x40,0x20,0x10, // 000 . . . 007
    0x80,0x80,0x80,0x80,0x40,0x40,0x20,0x08, // 008 . . . 015
    0x80,0x80,0x80,0x80,0x40,0x40,0x20,0x10, // 016 . . . 023
    0x80,0x80,0x80,0x80,0x40,0x40,0x20,0x04, // 024 . . . 031
    0x80,0x80,0x80,0x80,0x40,0x40,0x20,0x10, // 032 . . . 039
    0x80,0x80,0x80,0x80,0x40,0x40,0x20,0x08, // 040 . . . 047
    0x80,0x80,0x80,0x80,0x40,0x40,0x20,0x10, // 048 . . . 055
    0x80,0x80,0x80,0x80,0x40,0x40,0x20,0x02, // 056 . . . 063
    0x80,0x80,0x80,0x80,0x40,0x40,0x20,0x10, // 064 . . . 071
    0x80,0x80,0x80,0x80,0x40,0x40,0x20,0x08, // 072 . . . 079
    0x80,0x80,0x80,0x80,0x40,0x40,0x20,0x10, // 080 . . . 087
    0x80,0x80,0x80,0x80,0x40,0x40,0x20,0x04, // 088 . . . 095
    0x80,0x80,0x80,0x80,0x40,0x40,0x20,0x10, // 096 . . . 103
    0x80,0x80,0x80,0x80,0x40,0x40,0x20,0x08, // 104 . . . 111
    0x80,0x80,0x80,0x80,0x40,0x40,0x20,0x10, // 112 . . . 119
    0x80,0x80,0x80,0x80,0x40,0x40,0x20,0x01, // 120 . . . 127
    0x80,0x80,0x80,0x80,0x40,0x40,0x20,0x10, // 128 . . . 135
    0x80,0x80,0x80,0x80,0x40,0x40,0x20,0x08, // 136 . . . 143
    0x80,0x80,0x80,0x80,0x40,0x40,0x20,0x10, // 144 . . . 151
    0x80,0x80,0x80,0x80,0x40,0x40,0x20,0x04, // 152 . . . 159
    0x80,0x80,0x80,0x80,0x40,0x40,0x20,0x10, // 160 . . . 167
    0x80,0x80,0x80,0x80,0x40,0x40,0x20,0x08, // 168 . . . 175
    0x80,0x80,0x80,0x80,0x40,0x40,0x20,0x10, // 176 . . . 183
    0x80,0x80,0x80,0x80,0x40,0x40,0x20,0x02, // 184 . . . 191
    0x80,0x80,0x80,0x80,0x40,0x40,0x20,0x10, // 192 . . . 199
    0x80,0x80,0x80,0x80,0x40,0x40,0x20,0x08, // 200 . . . 207
    0x80,0x80,0x80,0x80,0x40,0x40,0x20,0x10, // 208 . . . 215
    0x80,0x80,0x80,0x80,0x40,0x40,0x20,0x04, // 216 . . . 223
    0x80,0x80,0x80,0x80,0x40,0x40,0x20,0x10, // 224 . . . 231
    0x80,0x80,0x80,0x80,0x40,0x40,0x20,0x08, // 232 . . . 239
    0x80,0x80,0x80,0x80,0x40,0x40,0x20,0x10, // 240 . . . 247
    0x80,0x80,0x80,0x80,0x40,0x40,0x20,0x01, // 248 . . . 255
};
```

Figure 10A:
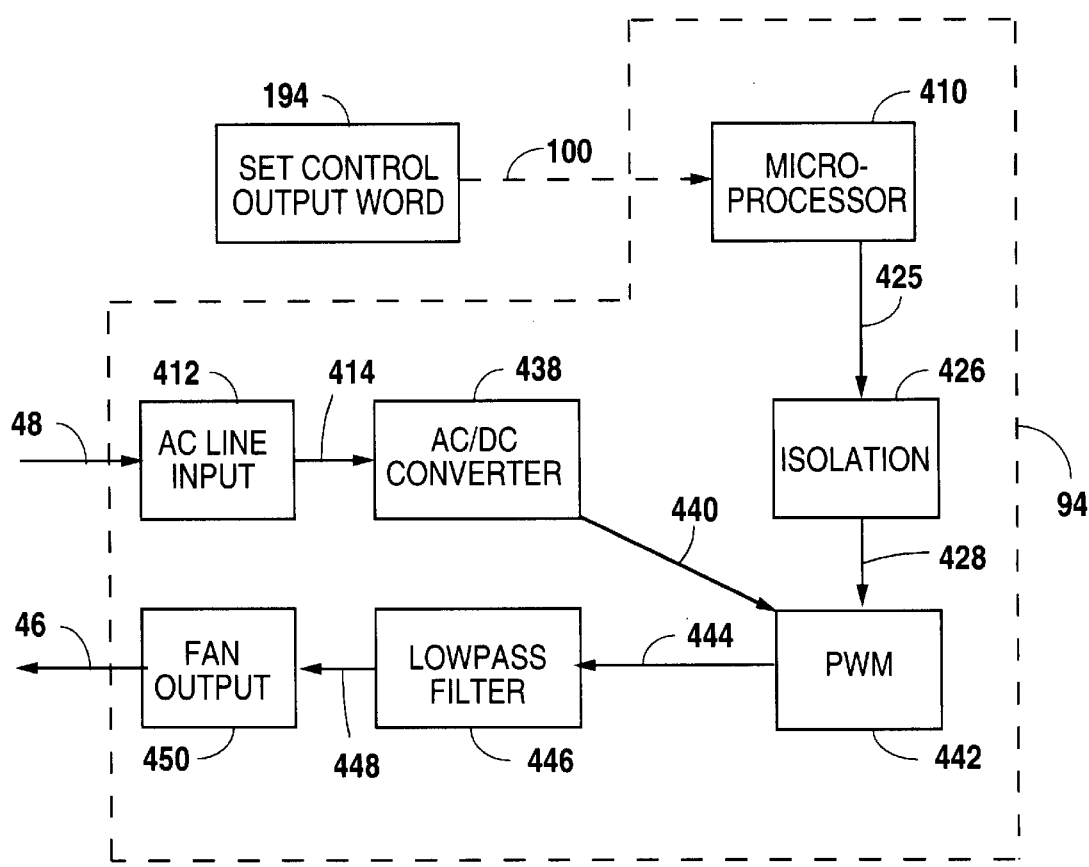
FIG. 10A, 10B, 10C illustrates an air handler subsystem for frequency control of an AC fan and pulse width modulation control of a DC fan.
Figure 10C:
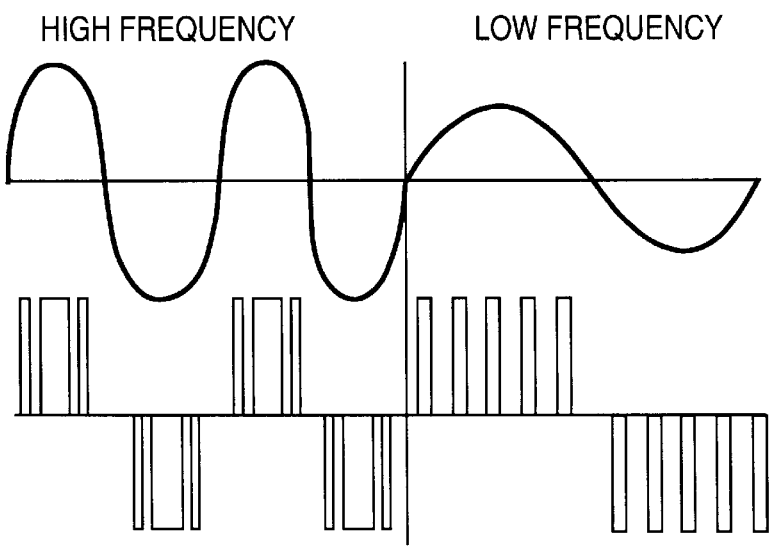
Figure 10B:
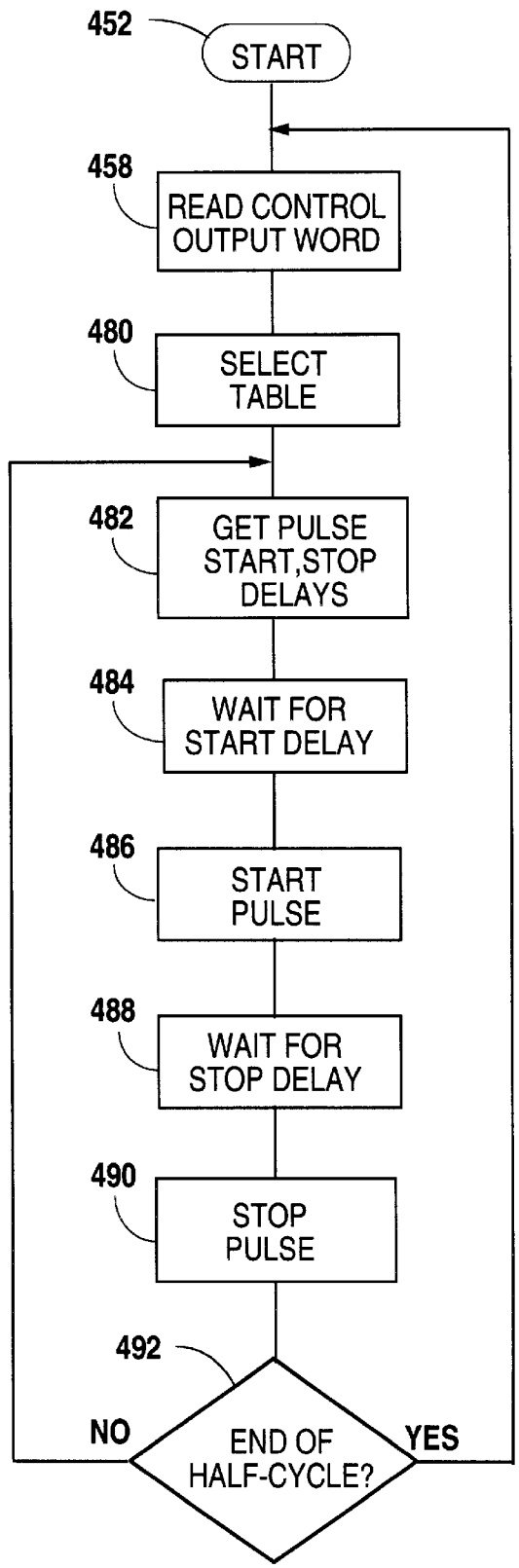

FIG. 10 is a block diagram of an air handler control subsystem for a variable frequency drive for an AC motor. We can control synchronous AC motors by changing the frequency of the AC voltage supplied to the motors. A pulse-width-modulator (PWM) allows us to create a variable waveform from a fixed DC power supply, and we use a low pass filter to produce the sine wave for the AC motor. We can actively brake the motor when PWM 442 is a 4-quadrant type, i.e., the PWM can sink and source current. A 2-quadrant PWM is cheaper, but motor deceleration occurs only from the load. A 3-phase motor would use three PWMs driven 1200 apart. FIG. 10A is the hardware block diagram, FIG. 10B is the software block diagram, and FIG. 10C is a sample output for a 2-quadrant variable voltage pulse width modulation air handler control subsystem.

AC line input 412 receives power from external AC power line 48, and sends AC signal 414 to AC/DC converter 438 to provide DC power supply 440. Microprocessor 410, sends start pulse 486 though opto-isolation buffer 426 to PWM 442. PWM 442 connects DC power supply 440 to PWM output 444. At the appropriate time, microprocessor 210 sends stop pulse 490 on to PWM 442. The resulting output 444 is the stepped pulse signal of FIG. 10C. Low pass filter 446 converts the high-frequency pulses to the sine wave with variable frequency and voltage amplitude in FIG. 10C before sending the signal to fan output. If the modulation frequency is high enough, the inductance of the motor adds additional filtering to the pulses allowing a smooth signal to flow through the motor.

During power-up of the IDP, the appropriate frequency/pulse width modulation table 480 is selected. After getting the appropriate pulse start and pulse stop delay values 482, microprocessor 410 waits for start delay 484 before sending start pulse 486. The control task waits for stop delay 488 before sending stop pulse 490. If this is not the end of this signal half-cycle, the control task returns to getting the appropriate pulse start and pulse stop delay values 482. If this is the end of this signal half-cycle, the control task returns to selecting the appropriate pulse width table 480. The pulse width table 480 is changed only at zero crossings for AC motors.

This application discloses an invention, the Intelligent Differential Pressure controller, that continuously monitors the differential air pressure between any two environments, the controlled environment and the reference environment, and dynamically adjusts the air handling system of the controlled environment to maintain a desired differential air pressure by using a closed loop control strategy. Local and remote users can configure operating parameters, monitor operation, and readjust the differential pressure setpoint as necessary. A differential sensor transmits data to the system controller for processing and analysis. The IDP interfaces to a wide variety of air handling systems by using interchangeable and modular air handling subsystems interfaces. Each subsystem has the necessary hardware interface and software control methodology to enable the IDP to interface easily and transparently with a wide variety of air handling configurations. This flexibility allows the invention to control air handling systems using voltage or current outputs to control solenoid driven valves, dampers, DC motors, and air compressors; and control air handler subsystems using phase, cycle, and frequency control of AC motors.

Other embodiments of the invention will be apparent to those skilled in the art after considering this specification or practicing the disclosed invention. The specification and examples above are exemplary only, with the true scope of the invention being indicated by the following claims.

I claim the following invention:

1. An apparatus that maintains a desired differential pressure setpoint between a sashless controlled environment and a reference environment by controlling an air handling system of said controlled environment by modifying the power supplied to an airflow device in said air handling system, comprising:

a differential pressure sensor connected to a system controller, said sensor transmits the current differential pressure data between a sashless controlled environment and a reference environment to said system controller, said system controller maintains a desired differential pressure setpoint in said sashless controlled environment;

a user communication interface connected to said system controller, said communication interface provides data input to and data output from said system controller from user sources; and an air handler subsystem coupled to said system controller, said air handler subsystem receives external power for modifying and supplies the modified power to an airflow device in an air handling system of said controlled environment using a pulse width modulation control interface, said system controller controls said air handling system by regulating said modified power to maintain said desired differential pressure setpoint in said sashless controlled environment.

2. A control system that maintains a desired differential pressure setpoint between a sashless controlled environment and a reference environment by controlling an air handling system of said controlled environment by modifying the power supplied to an airflow device in said air handling system, comprising:

sensor means connected to a system controller for gathering the differential pressure data between a sashless controlled environment and a reference environment, said sensor means transmits said data to said system controller, said system controller maintains a desired differential pressure setpoint in said sashless controlled environment;

user communication means for providing an interface for data input to and data output from said system controller from user sources; and an air handler subsystem coupled to said system controller, said air handler subsystem receives external power for modifying and supplies the modified power to an airflow device in an air handling system of said controlled environment using a pulse width modulation control interface, said system controller controls said air handling system by regulating said modified power to maintain said desired differential pressure setpoint in said sashless controlled environment.

3. A method for maintaining a desired differential pressure setpoint between a sashless controlled environment and a reference environment by controlling an air handling system of said controlled environment by modifying the power supplied to an airflow device in said air handling system, comprising the steps of:

gathering differential pressure data between a sashless controlled environment and a reference environment from a differential pressure sensor and transmitting said differential pressure data to a system controller;

processing said differential pressure data to maintain a desired differential pressure setpoint in said sashless controlled environment;

sending and receiving control and status information to a user communication device;

receiving external power for modifying by an air handler subsystem that couples to said system controller, said air handler subsystem supplies the modified power to an airflow device in an air handling system of said controlled environment using a pulse width modulating method; and controlling said air handling system of said controlled environment by regulating said modified power to maintain said desired differential pressure setpoint in said sashless controlled environment.

* * * * *

UNITED STATES PATENT AND TRADEMARK OFFICE
CERTIFICATE OF CORRECTION

PATENT NO : 5,810,657
DATED : 09/22/98
INVENTOR(S): Pariseau

It is certified that error appears in the above-identified patent and that said Letters Patent is hereby corrected as shown below:

In the specification:

Column 4, line 24, remove "wide".

Column 4, line 25, remove the first "(".

Column 5, line 53, "pasts" should be --parts--.

Column 7, line 39, after "50" insert --.--.

Column 8, line 40, "handier" should be --handler--.

Column 11, line 34, "handier" should be --handler--.

Column 11, line 39, "OV" should be --0 V--.

Column 11, line 48, "OV" hsould be --0 V--.

Column 11, line 60, "OV" should be --0 V--.

Column 12, line 25, "OV" hsould be --0 V--.

UNITED STATES PATENT AND TRADEMARK OFFICE
CERTIFICATE OF CORRECTION

PATENT NO : 5,810,657
DATED : 09/22/98
INVENTOR(S) : Pariseau

It is certified that error appears in the above-identified patent and that said Letters Patent is hereby corrected as shown below:

In the specification:

Column 12, line 34, "OV" should be --0 V--.

Column 12, line 46, "A" should be --AC--.

Column 13, line 44, "1200" should be --120°--.

Signed and Sealed this

Twenty-third Day of March, 1999

Q. TODD DICKINSON

Attest:

Attesting Officer

Acting Commissioner of Patents and Trademarks